(12) United States Patent
Maze et al.

(10) Patent No.: US 6,247,265 B1
(45) Date of Patent: *Jun. 19, 2001

(54) PEST EXTERMINATING METHOD AND APPARATUS

(76) Inventors: Howard Keith Maze; Norman Daryl Maze; Gary Keith Maze, all of Box 660, Unity, Saskatchewan (CA), S0K 4L0

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,304

(22) Filed: Jul. 9, 1999

(51) Int. Cl.[7] ............................................. A01M 13/00
(52) U.S. Cl. ............................................................ 43/124
(58) Field of Search ...................................... 43/124, 131

(56) References Cited

U.S. PATENT DOCUMENTS

| | | | | |
|---|---|---|---|---|
| 841,297 | * | 1/1907 | Wyard | 43/124 |
| 1,290,544 | * | 1/1919 | Graumann | 43/124 |
| 1,540,660 | * | 6/1925 | Snow | 43/124 |
| 2,906,056 | * | 9/1959 | Youngblood | 43/124 |
| 3,069,314 | * | 12/1962 | Jenkins | 43/124 |
| 3,132,067 | * | 5/1964 | Rauscher | 43/124 |
| 4,503,032 | * | 3/1985 | Friemal | 424/40 |
| 4,597,217 | * | 7/1986 | Narita | 43/125 |
| 4,804,142 | * | 2/1989 | Riley | 43/131 |
| 4,833,818 | * | 5/1989 | Berta | 43/124 |
| 5,054,231 | * | 10/1991 | Witherspoon | 43/124 |
| 5,109,629 | * | 5/1992 | King | 43/132.1 |
| 5,548,921 | * | 8/1996 | Kleisath | 43/124 |
| 5,588,252 | * | 12/1996 | Jones | 43/124 |

OTHER PUBLICATIONS

Metcalf & Flint, Destructive and Useful Insects, 3rd Ed. p. 303, 1951.*

* cited by examiner

*Primary Examiner*—Kurt Rowan
(74) *Attorney, Agent, or Firm*—Adrian D. Battison

(57) ABSTRACT

A method of exterminating gophers uses a pest exterminating apparatus which comprises a tank for storing anhydrous ammonia and a supply line connected to the tank for dispensing the anhydrous ammonia from the tank. The supply line can be connected to a gas valve in a gas dispensing position or a liquid valve in a liquid dispensing position. An elongate wand having a flexible tube mounted on a free end is connected to a dispensing end of the supply line for insertion of the flexible tube into a gopher's burrow. A person holding the supply line is spaced from the ammonia being dispensed due to the elongate wand. In use, the person positions the tank adjacent a gopher's burrow and inserts the flexible tube into the burrow. A lever on the dispensing end of the supply line allows a valve to be opened for dispensing a portion of the ammonia into the burrow. The tank may then be relocated adjacent another burrow.

2 Claims, 2 Drawing Sheets

PEST EXTERMINATING METHOD AND APPARATUS

FIELD OF THE INVENTION

This invention relates to a method and apparatus for exterminating pests and more particularly burrowing animals.

BACKGROUND

A common problem in agriculture is the loss of crops due to such pests as gophers and other burrowing animals. There is a wide variety of known techniques for killing gophers and the like which generally include some form of poison which is dispensed wherever the pests are located. Many known techniques currently in practice however are generally ineffective at killing the pests in sufficient numbers for effectively reducing crop loss, while other known techniques introduce harmful toxins into the environment. The present invention is concerned with an improved method of killing burrowing animals.

SUMMARY

According to one aspect of the present invention there is provided a pest exterminating method for exterminating burrowing animals, said method comprising;

providing a source of anhydrous ammonia; and dispensing a portion of the anhydrous ammonia into a burrow of a burrowing animal.

The use of anhydrous ammonia does not harm the crops in a field where gophers and other burrowing animals might be pests, while being very effective in killing the gophers almost immediately. In addition, the use of anhydrous ammonia for killing the gophers does not introduce a harmful poison into the environment which can be passed on to humans and other animals. The use of anhydrous ammonia in agriculture is known as a fertilizer and thus the use of anhydrous ammonia in fields having planted crops for killing burrowing animals does not introduce any new chemicals into the field that are harmful to the crop.

The anhydrous ammonia is preferably dispensed in a liquid state. When dispensing the anhydrous ammonia a supply line may be provided such that the supply line is inserted down into the burrow before the anhydrous ammonia is dispensed.

According to a further aspect of the present invention there is provided a pest exterminating apparatus for exterminating burrowing animals, said apparatus comprising;

a portable storage tank arranged to store anhydrous ammonia therein;

a supply line arranged to connect to the storage tank;

a dispensing valve on the supply line adjacent a dispensing end of the supply line for controlling an amount of the anhydrous ammonia being dispensed through the supply line into a burrow of an animal.

The supply line may be arranged to communicate with anhydrous ammonia in the tank which is in a liquid state for dispensing the anhydrous ammonia through dispensing end of the supply line in a liquid state.

The tank may include a gas valve for dispensing the anhydrous ammonia from the tank in a gaseous state and a liquid valve for dispensing the anhydrous ammonia from the tank in a liquid state and wherein the supply line is arranged to connect to the gas valve in a gas dispensing position and to the liquid valve in a liquid dispensing position.

An ejector wand is preferably mounted on the dispensing end of the supply line for dispensing the anhydrous ammonia therethrough at a distance spaced from a person holding the dispensing end of the supply line.

A flexible tube extension may be mounted at an end of the wand opposite the supply line for insertion into the burrow.

BRIEF DESCRIPTION OF THE DRAWINGS

In the accompanying drawings, which illustrate an exemplary embodiment of the present invention.

DETAILED DESCRIPTION

Figure 1:
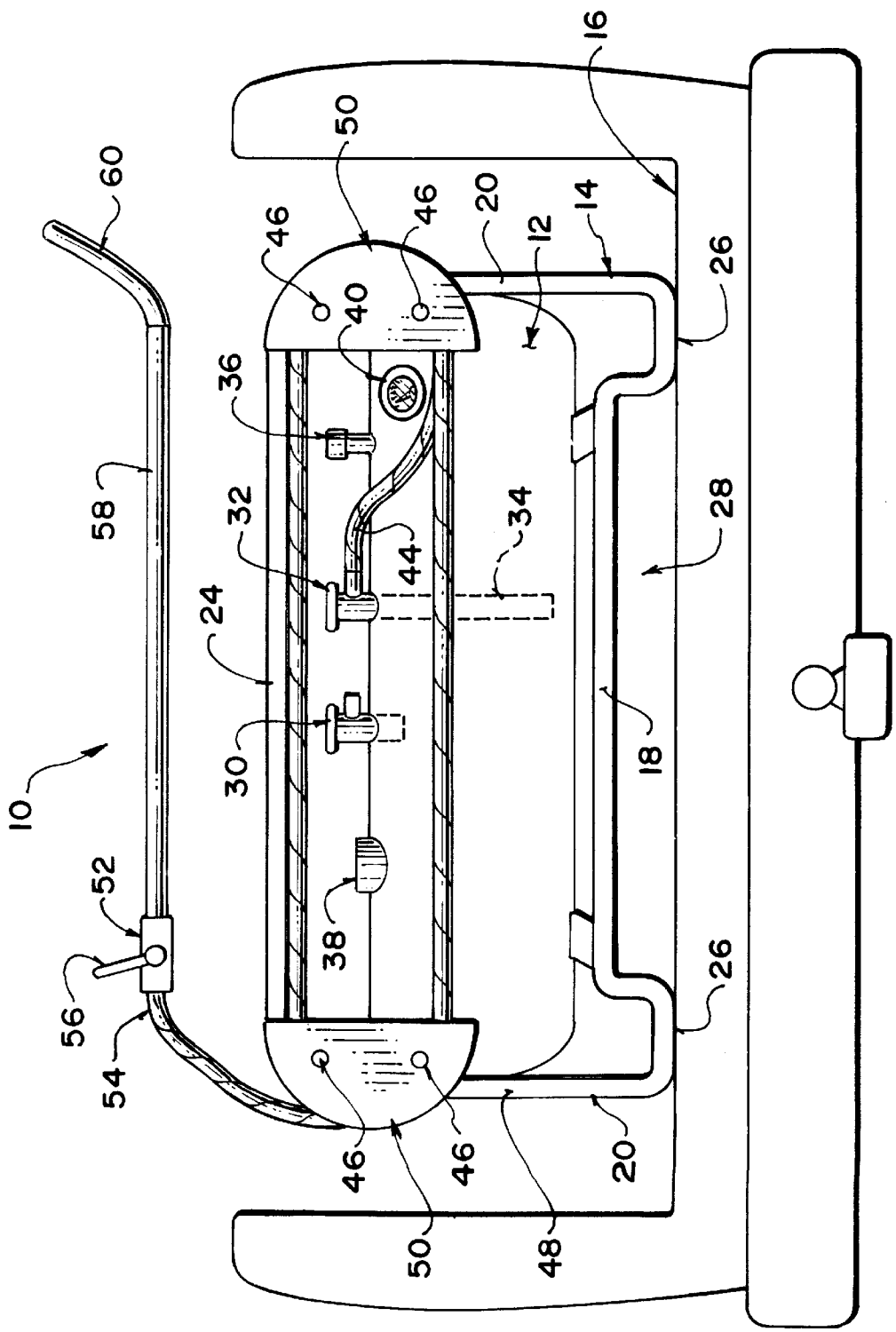
FIG. 1 is a front elevational view of the apparatus.
Figure 2:
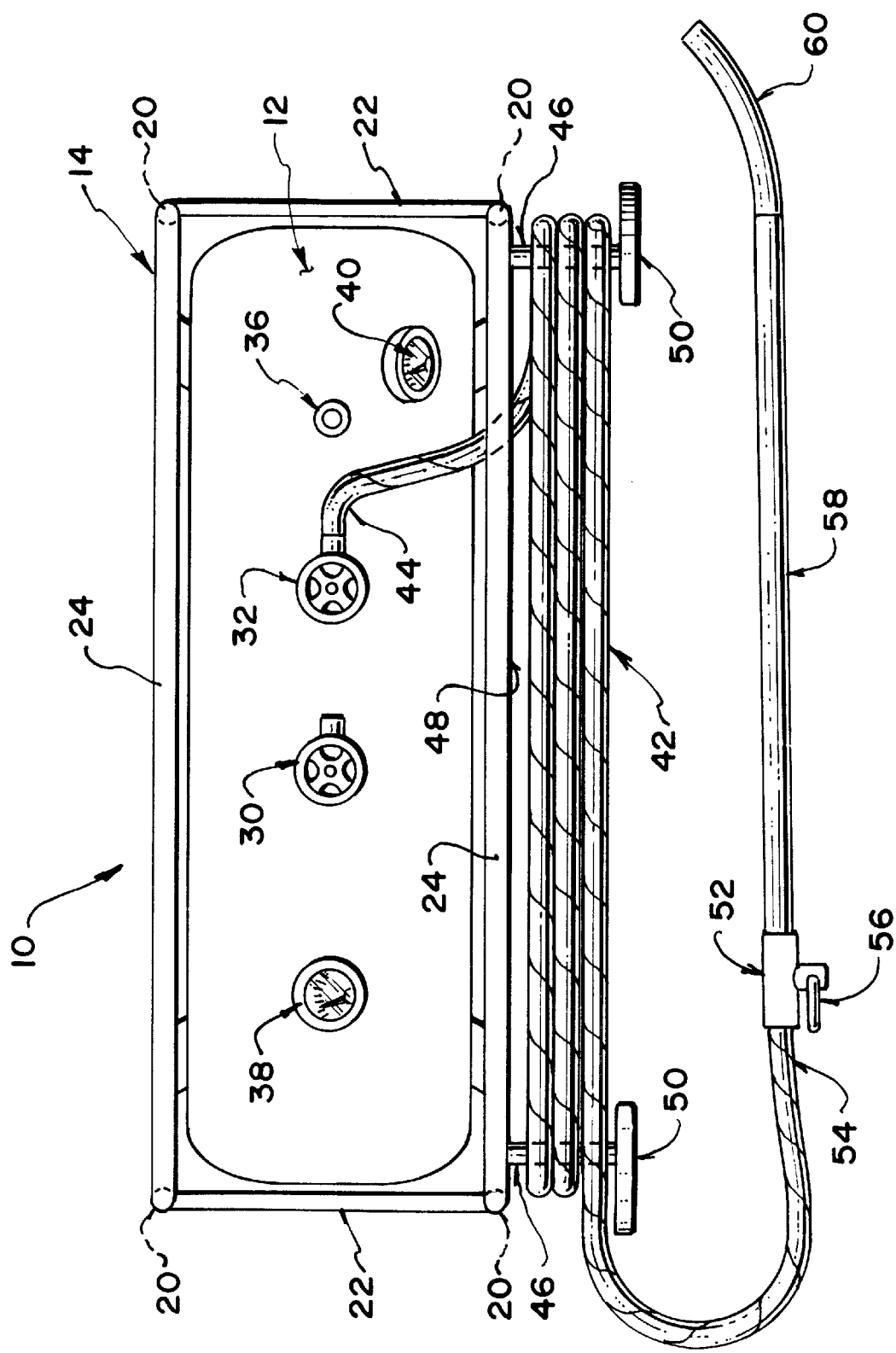
FIG. 2 is a top plan view of the apparatus.

Referring to the accompanying drawings, there is illustrated a pest exterminating apparatus generally indicated by reference numeral 10. The apparatus 10 is intended for use in exterminating burrowing animals and more particularly for exterminating gophers.

The apparatus 10 includes a tank 12 which is generally cylindrical in shape and capped at respective ends for storing anhydrous ammonia in the tank under pressure.

The tank 12 is supported on a frame 14 arranged to mount the tank on a truck bed 16 of a conventional truck. The frame 14 includes a pair of bottom members 18 which are parallel and spaced apart with cross members mounted therebetween for mounting the tank thereon. The bottom members 18 are supported at a position spaced upward from the ground by end members 20 mounted on respective ends of each bottom member. The end members 20 are upright posts having a curved bottom end. The end members 20 at each respective end of the frame are interconnected by a corresponding cross member 22. A pair of top members 24 are mounted parallel and spaced apart above the tank and connect between respective end members 20 at corresponding ends of the top members.

The frame 14 is thus generally rectangular in shape for housing the tank therein such that the tank is well secured and protected. The frame members are made of rigid tubular material. A bottom end 26 of the frame includes a recessed portion 28 due to the upwardly spaced mounting of the bottom members 18. The recessed portion allows the frame to be easily mounted on the forks of a forklift or other lifting equipment for ease of handling of the apparatus and for positioning the apparatus in the truck bed 16 as shown in FIG. 1.

A gas valve 30 is mounted on a top side of the tank 12 for dispensing the anhydrous ammonia from the tank in a gaseous state. A liquid valve 32 is mounted on the top side of the tank 12 adjacent the gas valve for dispensing the anhydrous ammonia from the tank in a liquid state. The liquid valve 32 includes an inner portion 34 which extends downward into the tank for communicating with the ammonia in the bottom of the tank which is in a liquid state.

A pressure relief valve 36 is mounted on the top side of the tank for relieving excessive pressure from within the tank and preventing damage to the tank and valves if the pressure in the tank were otherwise permitted to exceed a predetermined threshold. Under normal pressure conditions the pressure relief valve 36 remains closed.

A liquid level gauge 38 is mounted on the tank adjacent the top side in a visible location for indicating the level of the liquid ammonia in the tank. The liquid level gauge includes an internal sensor within the tank for measuring the level of the liquid ammonia.

A pressure gauge 40 is mounted on the tank at a level corresponding to approximately 85 percent of the height of the tank for visually indicating the pressure inside the tank.

A supply line 42 is connected at a first end 44 to the liquid valve 32 in a liquid dispensing position. In an alternative arrangement the supply line 42 can be connected at the first end 44 to the gas valve 30 in a gas dispensing position.

The supply line 42 is an elongate flexible tube arranged to dispense the anhydrous ammonia therethrough. A pair of support members 46 extend forward from a front side 48 of each end of the frame 14 for wrapping a length of the supply line thereabout. An end plate 50 mounts on a forward end of each pair of support members 46 for securing loops of the supply line on the support members.

A dispensing control valve 52 mounts on a second end 54 of the supply line 42 for controlling the amount of ammonia being dispensed through the supply line. The dispensing control valve 52 includes a lever 56 for manually opening and closing the valve 52.

An ejector wand 58 extends from the dispensing control valve 52 for dispensing the anhydrous ammonia therethrough at a position spaced from a person holding the dispensing control valve when in use. The wand 58 is an elongate rigid tube.

A flexible tube 60 is mounted on a free end of the wand 58 for insertion into a gopher's burrow. The flexible tube 60 allows the anhydrous ammonia to be dispensed therethrough for penetrating deeply into the burrow.

In use, the apparatus 10 is mounted on a truck bed 16 or on another suitable vehicle for easy transport. The tank 12 may then be positioned adjacent a burrow of a gopher. When the supply line 42 is connected to the liquid valve 32 the liquid valve may be left open while the lever 56 on the dispensing control valve 52 controls the ammonia being dispensed. A person holds the wand 58 and inserts the flexible tube 60 through an opening of the burrow and then down into the burrow. Opening the dispensing control valve 52 for approximately two seconds using the lever 56 allows sufficient anhydrous ammonia to be dispensed to kill a burrowing animal such as a gopher. The apparatus 10 may then be relocated adjacent another burrow.

When the supply line 42 is connected to the gas valve in the gas dispensing position, the dispensing control valve 52 is opened for approximately ten to twelve seconds. Otherwise, the apparatus is used similarly as noted above in the liquid dispensing position.

While one embodiment of the present invention has been described in the foregoing, it is to be understood that other embodiments are possible within the scope of the invention. The invention is to be considered limited solely by the scope of the appended claims.

What is claimed is:

1. A method of exterminating a burrowing animal located in a burrow, said method comprising;
    providing a portable storage tank;
    storing a poisonous substance consisting solely of anhydrous ammonia in the portable storage tank;
    providing a tubular supply line;
    coupling the supply line to the storage tank;
    providing a dispensing valve on the supply line for controlling an amount of the anhydrous ammonia to be dispensed from the tank through the supply line;
    inserting a free end of the supply line into the burrow; and
    killing the burrowing animal in the burrow by opening the dispensing valve so as to dispense a portion of the anhydrous ammonia from the portable storage tank through the supply line and into the burrow.

2. The method according to claim 1 wherein killing the burrowing animal includes dispensing the poisonous substance consisting solely of anhydrous ammonia into the burrow in a liquid state.

* * * * *